United States Patent
Cheng et al.

(10) Patent No.: US 12,371,070 B2
(45) Date of Patent: Jul. 29, 2025

(54) METHOD AND APPARATUS FOR PLANNING VEHICLE TRAJECTORY, INTELLIGENT DRIVING DOMAIN CONTROLLER, AND INTELLIGENT VEHICLE

(71) Applicant: SHENZHEN YINWANG INTELLIGENT TECHNOLOGIES CO., LTD., Shenzhen (CN)

(72) Inventors: Wanglong Cheng, Shenzhen (CN); Junguang He, Shenzhen (CN); Huaizhou Li, Hangzhou (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 487 days.

(21) Appl. No.: 17/848,216

(22) Filed: Jun. 23, 2022

(65) Prior Publication Data

US 2022/0324481 A1    Oct. 13, 2022

Related U.S. Application Data

(63) Continuation of application No. PCT/CN2020/132412, filed on Nov. 27, 2020.

(30) Foreign Application Priority Data

Dec. 24, 2019 (CN) ......................... 201911348578.5

(51) Int. Cl.
*B60W 60/00* (2020.01)

(52) U.S. Cl.
CPC ...... *B60W 60/005* (2020.02); *B60W 60/0027* (2020.02); *B60W 2520/10* (2013.01);
(Continued)

(58) Field of Classification Search
CPC ......... B60W 2556/65; B60W 2756/10; B60W 60/0027; G05D 1/0088; G05D 1/0212
See application file for complete search history.

(56) References Cited

U.S. PATENT DOCUMENTS

| | | | |
|---|---|---|---|
| 6,442,484 B1 * | 8/2002 | Miller | B60R 21/0134 701/532 |
| 8,510,041 B1 * | 8/2013 | Anguelov | G01S 19/41 701/445 |

(Continued)

FOREIGN PATENT DOCUMENTS

| | | |
|---|---|---|
| CN | 104590274 A | 5/2015 |
| CN | 107139917 A | 9/2017 |

(Continued)

OTHER PUBLICATIONS

Office Action in Chinese Appln. No. 201911348578.5, dated Nov. 19, 2020, 12 pages.

(Continued)

*Primary Examiner* — Redhwan K Mawari
(74) *Attorney, Agent, or Firm* — Fish & Richardson P.C.

(57) ABSTRACT

This application provides a method and an apparatus for planning a vehicle trajectory, an intelligent driving domain controller, and an intelligent vehicle. One example method includes: An intelligent driving domain controller of a first vehicle obtains a first trajectory of the first vehicle, obtains a second trajectory of at least one second vehicle based on a first communications technology, and then determines trajectory planning of the first vehicle based on the first trajectory and the second trajectory of the at least one second vehicle.

20 Claims, 5 Drawing Sheets

(52) U.S. Cl.
CPC ... *B60W 2520/105* (2013.01); *B60W 2540/10* (2013.01); *B60W 2540/12* (2013.01); *B60W 2540/16* (2013.01); *B60W 2540/18* (2013.01); *B60W 2540/20* (2013.01); *B60W 2552/30* (2020.02); *B60W 2554/802* (2020.02); *B60W 2555/60* (2020.02); *B60W 2556/45* (2020.02)

(56) References Cited

U.S. PATENT DOCUMENTS

| | | | | |
|---|---|---|---|---|
| 9,623,874 | B2* | 4/2017 | Baek | B60W 40/09 |
| 9,633,564 | B2* | 4/2017 | Ferguson | G01C 21/3848 |
| 10,054,455 | B2 | 8/2018 | Asakura et al. | |
| 10,421,453 | B1 | 9/2019 | Ferguson et al. | |
| 10,782,685 | B1* | 9/2020 | Sucan | G05D 1/0077 |
| 10,983,529 | B2* | 4/2021 | Max | G05D 1/0274 |
| 11,126,187 | B2* | 9/2021 | McGill, Jr. | G05D 1/0088 |
| 11,354,913 | B1* | 6/2022 | Houston | G06F 18/24 |
| 2014/0179338 | A1* | 6/2014 | Shang | H04W 4/023 |
| | | | | 455/456.1 |
| 2014/0236414 | A1* | 8/2014 | Droz | G06V 20/58 |
| | | | | 701/1 |
| 2015/0224988 | A1* | 8/2015 | Buerkle | B60W 30/0956 |
| | | | | 701/45 |
| 2015/0338852 | A1 | 11/2015 | Ramanujam | |
| 2017/0031361 | A1* | 2/2017 | Olson | G06V 20/56 |
| 2017/0186319 | A1* | 6/2017 | Tsushima | B60W 30/0956 |
| 2018/0126977 | A1* | 5/2018 | Kim | G08G 1/096791 |
| 2018/0170382 | A1* | 6/2018 | Soliman | B60L 15/2045 |
| 2018/0173240 | A1* | 6/2018 | Fang | G05D 1/0212 |
| 2018/0188031 | A1* | 7/2018 | Samper | G05D 1/0061 |
| 2018/0196427 | A1* | 7/2018 | Majumdar | G05D 1/0061 |
| 2018/0196436 | A1* | 7/2018 | Gupta | G05D 1/0212 |
| 2018/0244275 | A1* | 8/2018 | Bremkens | B60W 30/18163 |
| 2018/0374359 | A1* | 12/2018 | Li | G06V 10/7788 |
| 2019/0049968 | A1* | 2/2019 | Dean | G06T 7/292 |
| 2019/0072965 | A1* | 3/2019 | Zhang | G08G 1/166 |
| 2019/0072973 | A1* | 3/2019 | Sun | B62D 15/025 |
| 2019/0202479 | A1* | 7/2019 | Beauvais | B60W 50/16 |
| 2019/0315346 | A1* | 10/2019 | Yoo | G05D 1/0061 |
| 2019/0337511 | A1* | 11/2019 | Nguyen | B60W 30/0956 |
| 2020/0047750 | A1* | 2/2020 | Likhachev | G05D 1/0214 |
| 2020/0047769 | A1* | 2/2020 | Oguro | B60W 60/0051 |
| 2020/0074061 | A1* | 3/2020 | Kim | H04L 9/0891 |
| 2020/0079379 | A1* | 3/2020 | Mimura | B60W 10/04 |
| 2020/0089246 | A1* | 3/2020 | McGill, Jr. | G05D 1/0221 |
| 2020/0117200 | A1* | 4/2020 | Akella | B60W 50/0097 |
| 2020/0156631 | A1* | 5/2020 | Lin | G05D 1/0257 |
| 2020/0279487 | A1* | 9/2020 | Toda | B60W 60/0015 |
| 2020/0318973 | A1* | 10/2020 | Bush | G01C 21/32 |
| 2020/0339156 | A1* | 10/2020 | Tsuchiya | B60W 30/0956 |
| 2020/0398868 | A1* | 12/2020 | Horii | B60W 50/14 |
| 2020/0409391 | A1* | 12/2020 | Zhu | G05D 1/0088 |
| 2021/0001867 | A1* | 1/2021 | Rondinone | H04W 4/48 |
| 2021/0024069 | A1* | 1/2021 | Herman | B60W 60/00274 |
| 2021/0061276 | A1* | 3/2021 | Zhang | B60W 10/18 |
| 2021/0094539 | A1* | 4/2021 | Beller | G05D 1/0214 |
| 2021/0116914 | A1* | 4/2021 | Ren | G06V 20/58 |
| 2021/0146896 | A1* | 5/2021 | Bush | B60Q 1/302 |
| 2021/0192956 | A1* | 6/2021 | Takeda | G08G 1/167 |
| 2021/0208596 | A1* | 7/2021 | Tong | B62D 15/02 |
| 2021/0271245 | A1* | 9/2021 | Bradley | G05D 1/227 |
| 2023/0019462 | A1* | 1/2023 | Busse | B60W 60/0011 |

FOREIGN PATENT DOCUMENTS

| | | |
|---|---|---|
| CN | 108022450 A | 5/2018 |
| CN | 108407717 A | 8/2018 |
| CN | 108657176 A | 10/2018 |
| CN | 108932462 A | 12/2018 |
| CN | 109389847 A | 2/2019 |
| CN | 109885058 A | 6/2019 |
| CN | 109910880 A | 6/2019 |
| CN | 109945880 A | 6/2019 |
| CN | 110146100 A | 8/2019 |
| CN | 110287529 A | 9/2019 |
| CN | 110366710 A | 10/2019 |
| CN | 110379193 A | 10/2019 |
| CN | 111123933 A | 5/2020 |
| CN | 108027242 B | 6/2021 |
| EP | 3457383 A1 | 3/2019 |
| WO | 2019231455 A1 | 12/2019 |

OTHER PUBLICATIONS

Extended European Search Report in European Appln No. 20906290.0, dated Dec. 5, 2022, 9 pages.

International Search Report and Written Opinion in International Appln. No. PCT/CN2020/132412, mailed on Mar. 1, 2021, 22 pages (with English translation).

* cited by examiner

METHOD AND APPARATUS FOR PLANNING VEHICLE TRAJECTORY, INTELLIGENT DRIVING DOMAIN CONTROLLER, AND INTELLIGENT VEHICLE

CROSS-REFERENCE TO RELATED APPLICATION

This application is a continuation of International Application No. PCT/CN2020/132412, filed on Nov. 27, 2020, which claims priority to Chinese Patent Application No. 201911348578.5, filed on Dec. 24, 2019. The disclosures of the aforementioned applications are hereby incorporated by reference in their entireties.

TECHNICAL FIELD

This application relates to the field of intelligent vehicles, and in particular, to a method and an apparatus for planning a vehicle trajectory, an intelligent driving domain controller, and an intelligent vehicle.

BACKGROUND

In a process of automated driving (automated driving, ADS), an intelligent vehicle (smart/intelligent car) may plan a collision-free safe path based on an ambient environment. Obstacle information is one of important inputs for path planning. In a conventional technology, due to lack of trajectory prediction of an obstacle, it is a static analysis process in which a driving condition of the obstacle only at a current moment is analyzed and predicted. However, as time changes, a driving trajectory of the obstacle dynamically changes, and the driving trajectory of the obstacle may jump or even collide with another person or object. With development of an automotive industry, an autonomous vehicle and a man-driving vehicle may coexist on a road for quite a long time in the future. The intelligent vehicle needs to predict a driving trajectory of a surrounding vehicle, so as to plan a driving trajectory of the vehicle. Currently, the intelligent vehicle performs trajectory prediction mainly by using a sensor equipped in the intelligent vehicle, and predicts a trajectory of the surrounding vehicle based on information such as historical data of the surrounding vehicle and a road topology according to a unified rule (for example, by default, a front vehicle avoids an obstacle preferentially from the left when encountering the obstacle) by assuming that the obstacle may maintain a current motion state without great changes in velocity and direction. However, there is great uncertainty in vehicle motion on the road actually. For example, a behavior of the man-driving vehicle is determined by a driver subjectively, and a behavior of the autonomous vehicle possibly has a plurality of behavior decisions in a same scenario. By using the foregoing method, it is difficult to make deterministic prediction, and consequently, the autonomous vehicle cannot accurately perform trajectory planning. Therefore, a method for accurately predicting a trajectory of a vehicle becomes an urgent technical problem to be solved in a field of intelligent vehicles.

SUMMARY

This application provides a method and an apparatus for planning a vehicle trajectory, which are used by an intelligent vehicle for accurate trajectory planning.

According to a first aspect, this application provides a method for planning a vehicle trajectory. The method may be applied to an intelligent driving domain controller of a first vehicle. The intelligent driving domain controller obtains a first trajectory of the first vehicle, obtains a second trajectory of at least one second vehicle based on a first communication technology, and then determines trajectory planning of the first vehicle based on the first trajectory and the second trajectory of the at least one second vehicle. In this way, a determining error caused by trajectory prediction performed only based on a running trajectory of a vehicle at a current moment in a conventional technology is avoided. In this method, a trajectory change of another vehicle can be identified. It can be ensured that the first vehicle does not simultaneously appear at a same location with any other vehicle, so as to avoid collision, thereby improving driving safety of an intelligent vehicle.

In a possible design, when the intelligent driving domain controller obtains the first trajectory of the first vehicle, a specific method may be: The intelligent driving domain controller first determines a current driving mode of the first vehicle, and then obtains the first trajectory of the first vehicle based on the driving mode of the first vehicle, where the driving mode includes an autonomous driving mode and a manual driving mode. By using the foregoing method, the intelligent driving domain controller may accurately obtain the first trajectory of the first vehicle based on an actual driving mode of the first vehicle, and then perform subsequent accurate trajectory planning.

In another possible design, when the intelligent driving domain controller obtains the first trajectory of the first vehicle based on the driving mode of the first vehicle, a specific method may be: When the intelligent driving domain controller determines that the current driving mode of the first vehicle is the autonomous driving mode, the intelligent driving domain controller obtains an autonomous driving trajectory of the first vehicle, and then uses the autonomous driving trajectory as the first trajectory. In this way, the first vehicle may obtain a trajectory matching the autonomous driving mode of the first vehicle, so as to complete subsequent accurate trajectory planning.

In another possible design, when the intelligent driving domain controller obtains the first trajectory of the first vehicle based on the driving mode of the first vehicle, a specific method may be: When the intelligent driving domain controller determines that the current driving mode of the first vehicle is the manual driving mode, the intelligent driving domain controller may predict a manual driving trajectory of the first vehicle, and then uses the predicted manual driving trajectory as the first trajectory. When the first vehicle is in the manual driving mode, the intelligent driving domain controller can complete subsequent accurate trajectory planning based on the predicted first trajectory that matches a driving habit of a current driver.

In another possible design, when the intelligent driving domain controller predicts the manual driving trajectory of the first vehicle, a specific method may be: The intelligent driving domain controller obtains a first parameter set and a trajectory prediction model corresponding to the first vehicle, predicts a trajectory point of the first vehicle based on the first parameter set and the trajectory prediction model, and finally determines the manual driving trajectory of the first vehicle based on the trajectory point of the first vehicle. The first parameter set includes a location of the first vehicle, driving data of a surrounding obstacle of the first vehicle relative to the first vehicle, and a driving status of the first vehicle. The driving status of the first vehicle is used to indicate a driving habit of a user currently driving the first vehicle. The trajectory prediction model is trained based on historical data of the driving habit of the user currently driving the first vehicle. By using the foregoing method, the intelligent driving domain controller may predict the driving trajectory of the first vehicle with reference to a driving habit of a driver currently driving the first vehicle, so that the trajectory obtained is more consistent with an actual trajectory and more accurate.

In another possible design, the location of the first vehicle may include a longitude and a latitude that identify the location of the first vehicle. The surrounding obstacle of the first vehicle may include one or more obstacles, and driving data of any obstacle may include a relative velocity and a relative distance of the any obstacle relative to the first vehicle. The driving status of the first vehicle includes an attribute of a current lane on a road on which the first vehicle is located, a road radius, and a velocity, an acceleration, an opening degree of an accelerator pedal, an opening degree of a brake pedal, a front right brake wheel cylinder, a front left brake wheel cylinder, a rear right brake wheel cylinder, a rear left brake wheel cylinder, a steering wheel angle, a steering wheel angle velocity, a steering wheel torque, a gear, and a turn light signal that are of the first vehicle.

In another possible design, the trajectory point of the first vehicle includes a predicted longitude and a predicted latitude that are included in a predicted driving trajectory of the first vehicle. In this way, one predicted location of the first vehicle can be obtained based on prediction precision and a prediction dimension that are included in each trajectory point, and predicted locations may form a predicted driving trajectory.

In another possible design, the trajectory point of the first vehicle further includes confidence of the predicted longitude and confidence of the predicted latitude. Confidence of prediction precision identifies accuracy of the prediction precision, and the confidence of the predicted latitude identifies accuracy of the predicted latitude. In this way, when the predicted trajectory is obtained based on the trajectory point, accuracy of the trajectory point may be learned, so that accuracy of the predicted trajectory can be determined.

In another possible design, the intelligent driving domain controller may send the first parameter set and the trajectory point of the first vehicle to a cloud server, so that the cloud server corrects the trajectory prediction model based on the first parameter set and the trajectory point of the first vehicle, and receives a corrected trajectory prediction model sent by the cloud server. Then, the intelligent driving domain controller predicts a trajectory point of the first vehicle by using the corrected trajectory prediction model and a second parameter set. The second parameter set is data that is collected at a current moment and that includes a location of the first vehicle, driving data of a surrounding obstacle of the first vehicle relative to the first vehicle, and a driving status of the first vehicle. In this way, a trajectory prediction model determined based on a driving habit of each driver is obtained. In the foregoing method, a customized trajectory prediction model can be obtained for each driver in the intelligent vehicle or a non-intelligent vehicle in the manual driving mode, and a driving trajectory of the vehicle is predicted based on the driving habit of each driver. Compared with that based on a method for performing trajectory prediction by using a unified rule in a conventional technology, a prediction result is closer to the driving trajectory of the vehicle. Further, the intelligent driving domain controller may determine the driving trajectory of the first vehicle based on the predicted trajectory obtained based on the prediction model, to properly plan the driving trajectory of the first vehicle, so as to reduce a risk of collision with another vehicle.

In another possible design, the intelligent driving domain controller sends the first trajectory to the at least one second vehicle. In this way, the at least one second vehicle may perform trajectory planning with reference to the first trajectory.

In another possible design, before communicating with the at least one second vehicle, the intelligent driving domain controller determines that the at least one second vehicle is in a specified range, or the intelligent driving domain controller determines that the first vehicle and the at least one second vehicle have passed security authentication. The specified range is a circular area centered on the first vehicle, and a radius of the circular area is a specified value. In this way, security of inter-vehicle data transmission is ensured.

In another possible design, the first communication technology is a vehicle wireless communication technology V2X.

In another possible design, the intelligent driving domain controller determines the driving trajectory of the first vehicle according to at least one of the following rules: Rule 1: No traffic rule is violated. Rule 2: A distance from an obstacle (for example, another vehicle) needs to be greater than a preset value. Rule 3: Not at a same location as an obstacle (for example, another vehicle) at a same moment.

According to a second aspect, this application provides an intelligent driving domain controller, where the intelligent driving domain controller includes modules or units, such as a processing unit and an obtaining unit, configured to perform the method for planning a vehicle trajectory according to any one of the first aspect and the possible designs of the first aspect.

According to a third aspect, this application provides an intelligent driving domain controller, and the intelligent driving domain controller includes a processor and a memory. When the intelligent driving domain controller runs, the processor executes a computer program or computer executable instructions stored in the memory, so that the intelligent driving domain controller performs a corresponding method according to any one of the first aspect and the possible designs of the first aspect.

According to a fourth aspect, this application provides an intelligent vehicle, and the intelligent vehicle may include the intelligent driving domain controller according to the second aspect or the third aspect. The intelligent vehicle may be the first vehicle involved in the first aspect.

According to a fifth aspect, this application provides a system, and the system may include the foregoing first vehicle and the foregoing at least one second vehicle.

According to a sixth aspect, this application provides a computer-readable storage medium, and the computer-readable storage medium stores a program or instructions. When the program or the instructions runs or run on a computer, the computer is enabled to perform the method according to any one of the first aspect and the possible designs of the first aspect.

According to a seventh aspect, this application provides a computer program product including instructions, and when the computer program product runs on a computer, the computer is enabled to perform the method according to any one of the first aspect and the possible designs of the first aspect.

DESCRIPTION OF EMBODIMENTS

The following further describes embodiments of this application with reference to the accompanying drawings.

Figure 1:
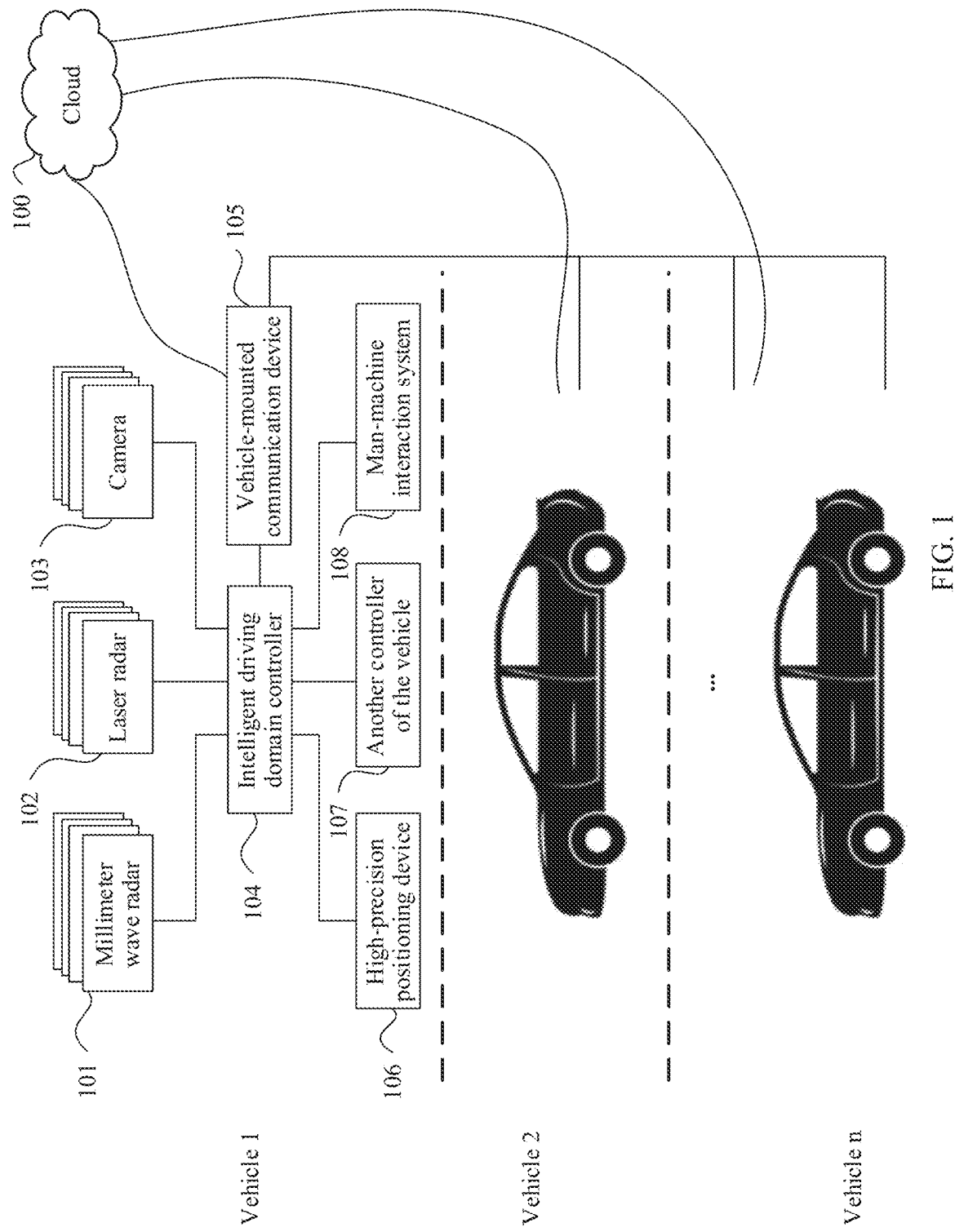
FIG. 1 is a schematic diagram of an architecture of a system to which a method for planning a vehicle trajectory is applied according to this application.

FIG. 1 is a schematic diagram of an architecture of a system to which a method for planning a vehicle trajectory is applied according to an embodiment of this application. The architecture of the system includes at least two vehicles and a cloud 100. In FIG. 1, n vehicles are shown, which are a vehicle (vehicle) 1, a vehicle 2, . . . , and a vehicle n, where n is an integer greater than or equal to 2. Specifically, the n vehicles include an intelligent vehicle and a non-intelligent vehicle. The at least two vehicles are autonomous vehicles with a manual driving mode. In actual driving, each vehicle may work in an autonomous driving mode, or may work in the manual driving mode.

Any one of the vehicles may include a sensor, an intelligent driving domain controller 104, a vehicle-mounted communication device 105, a high-precision positioning device 106, another controller 107 of the vehicle, and a man-machine interaction system 108. The sensor includes one or more of the following devices: at least one millimeter wave radar 101, at least one laser radar 102, and at least one camera 103. Specifically, only those in the vehicle 1 are shown in FIG. 1. The following describes in detail functions of the foregoing modules included in the vehicle.

The millimeter wave radar 101 is a radar that works in a millimeter-wave band (millimeter wave) for detecting; and is configured to: collect a beam transmission time and a beam velocity that are of a beam that arrives at an obstacle, and send collected data to the intelligent driving domain controller 104; or is configured to: after collecting a beam transmission time and a beam velocity, calculate data such as a distance and a velocity that are of a surrounding obstacle, and send calculated data to the intelligent driving domain controller 104.

The laser radar 102 is a radar system that emits a laser beam to detect characteristic quantities such as a location and a velocity of a target. A working principle of the laser radar 102 is as follows: A sounding signal (a laser beam) is transmitted to a target. Then, a received signal (a target echo) reflected from the target is compared with the transmitted signal, so that after proper processing, related data of the target can be obtained, for example, parameters such as a distance, an orientation, a height, a velocity, a gesture, and even a shape that are of the target. In this application, the laser radar 102 is configured to: collect a signal reflected from an obstacle, and send the reflected signal and a transmitted signal to the intelligent driving domain controller 104; or after collecting a signal reflected from an obstacle, compare the signal with a transmitted signal, to obtain data such as a distance and a velocity that are of a surrounding obstacle through processing, and send the data obtained through processing to the intelligent driving domain controller 104.

The camera 103 is configured to collect a surrounding image or video, and send the collected image or video to the intelligent driving domain controller 104. When the camera 103 is an intelligent camera, after collecting the image or the video, the camera 103 may analyze the image or the video to obtain a velocity, a distance, and the like that are of a surrounding obstacle, and send the data obtained through analyzing to the intelligent driving domain controller 104.

The high-precision positioning device 106 collects precise location information (an error is less than 20 cm) of a current vehicle and global positioning system (global positioning system, GPS) time information corresponding to the precise location information, and sends the collected information to the intelligent driving domain controller 104. The high-precision positioning device 106 may be a combined positioning system or a combined positioning module. The high-precision positioning device 106 may include devices and sensors such as a global navigation satellite system (global navigation satellite system, GNSS) and an inertial measurement unit (inertial measurement unit, IMU). The global navigation satellite system can output global positioning information with specific precision (for example, 5 Hz to 10 Hz), and a frequency of the inertial measurement unit is usually relatively high (for example, 1000 Hz). The high-precision positioning device 106 can output accurate high-frequency positioning information (usually, 200 Hz or above is required) by fusing information of the inertial measurement unit and the global navigation satellite system.

The another controller 107 of the vehicle executes a control command of the intelligent driving domain controller 104, and sends related information such as a steering, a gear, an acceleration, and a deceleration that are of the vehicle to the intelligent driving domain controller 104.

The man-machine interaction system 108 provides an audio and video manner used for message interaction between an intelligent vehicle and a driver, and may display trajectories of the vehicle and another vehicle by using a display screen.

The intelligent driving domain controller 104 may be disposed in a vehicle. The intelligent driving domain controller 104 is specifically implemented by a processor, and the processor includes a central processing unit (central processing unit, CPU) or a device or a module that has a processing function. For example, the intelligent driving domain controller 104 may be a vehicle-mounted mobile data center (mobile data center, MDC). When an automatic driving function is executed, that is, in the autonomous driving mode, the intelligent driving domain controller 104 sends trajectory planning information to the vehicle-mounted communication device 105, and sends location information of the vehicle and a predicted trajectory of another surrounding vehicle to the man-machine interaction system 108. When a person drives the vehicle, that is, in the manual driving mode, information from a sensor, an actual trajectory of the vehicle, and a predicted trajectory of the vehicle (predicted by using a neural network or another artificial intelligence (artificial intelligence, AI) algorithm based on the information from the sensor and information transmitted by the another controller of the vehicle) are sent to the vehicle-mounted communication device 105, and location information of the vehicle and a predicted trajectory of another surrounding vehicle are sent to the man-machine interaction system 108.

The vehicle-mounted communication device 105 is a device that communicates with another vehicle, receives trajectory prediction information of the another vehicle (which may alternatively be described as a predicted trajectory, trajectory information, or the like), sends the trajectory prediction information to the intelligent driving domain controller 104, and sends a trajectory of the vehicle to another surrounding vehicle; and communicates with the cloud 100, sends information from a sensor, positioning information, and information from another controller that are of the vehicle to the cloud 100, and receives a model parameter trained by the cloud 100. For example, the vehicle-mounted communication device 105 may be a telematics box (telematics BOX, TBOX).

It should be noted that the foregoing involved surrounding obstacle herein refers to another vehicle. A distance and a velocity of the obstacle are respectively a relative distance and a relative velocity of the obstacle relative to the vehicle.

It should be noted that, in order to improve driving safety of the intelligent vehicle, mutual trust may be established for inter-vehicle information transmission in a vehicle communication process. For example, any vehicle may perform information transmission with a vehicle in a preset range, where the preset range may be a circular area that uses the vehicle as a center and a specified value as a radius. The specified value of the radius may be specified based on a range of V2X communication that can be supported by the vehicle. For another example, inter-vehicle mutual trust may be established through authentication. Specifically, mutual authentication information may be used, and after the authentication succeeds, communication may be performed to share information. For another example, inter-vehicle information transmission may be performed within a specified time period. For another example, an automotive information security standard 21434 and the like may be complied between vehicles, so that received information of another vehicle is used only for driving of the vehicle, but is not recorded. Certainly, there are other manners, which are not listed one by one in this application.

The cloud 100 trains a model based on the information from a sensor, the positioning information, and the information from another controller, and sends a trained model parameter to the vehicle-mounted communication device 105. The cloud 100 may be a cloud data center that can implement model training, or may be a physical device or a virtual machine that can perform model training. This is not limited in this application.

Based on the foregoing system, in a vehicle driving process, any vehicle can obtain a driving trajectory of a surrounding vehicle within a preset time period, to restrict trajectory planning of the vehicle, thereby improving safety. For example, in a schematic diagram of a scenario shown in FIG. 2, there are three autonomous vehicles a vehicle 1, a vehicle 2, and a vehicle 3 in this scenario, and at least one of the three vehicles is in a manual driving mode. Each of the three vehicles may predict a driving trajectory of the vehicle based on a driving mode of the vehicle. For example, an example in which the vehicle 1 performs trajectory planning is used for description. In a process in which the vehicle 1 performs trajectory planning, the vehicle 1 may obtain, by using a V2X technology, driving trajectories predicted by the vehicle 2 and the vehicle 3, and then perform trajectory planning with reference to a driving trajectory predicted by the vehicle 1. In this way, accuracy of trajectory planning of the vehicle 1 can be improved, thereby improving driving safety.

It should be understood that a trajectory planning method of each of the vehicle 2 and the vehicle 3 is similar to a trajectory planning method of the vehicle 1, and references may be made to each other.

It should be noted that the foregoing involved preset time period may be determined based on a latency required by a V2X transmission technology, or may be a preset empirical value, for example, 5 seconds to 10 seconds (s). Certainly, the preset time period may be determined in another manner, which is not limited in this application.

Figure 2:
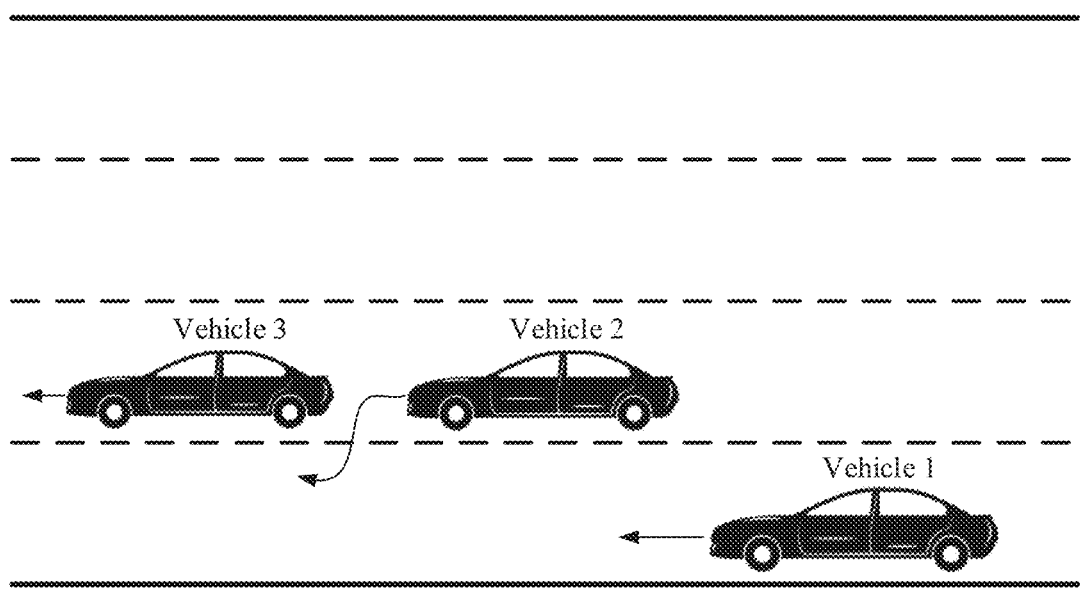
FIG. 2 is a schematic diagram of a vehicle driving scenario according to this application.
Figure 3:
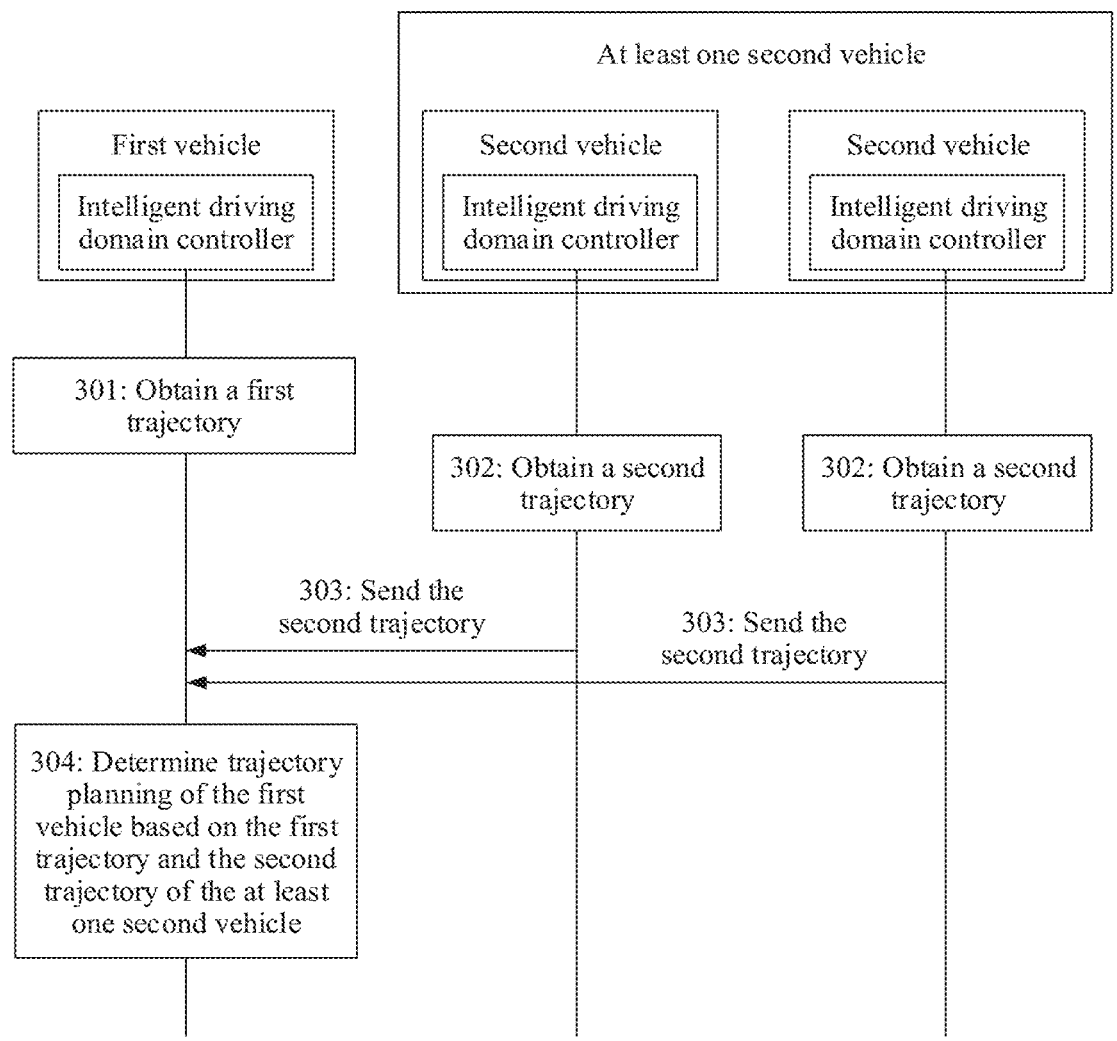
FIG. 3 is a flowchart of a method for planning a vehicle trajectory according to this application.

Based on the foregoing description, an embodiment of this application provides a method for planning a vehicle trajectory, which is applicable to the system shown in FIG. 1 and the scenario shown in FIG. 2. The method may be used for trajectory planning of a first vehicle, where the first vehicle is an intelligent vehicle. The method may be implemented by an intelligent driving domain controller of the first vehicle. Referring to FIG. 3, a specific procedure of the method may include:

Step 301: The intelligent driving domain controller of the first vehicle obtains a first trajectory of the first vehicle.

Specifically, when the intelligent driving domain controller of the first vehicle obtains the first trajectory, a specific method may be: The intelligent driving domain controller of the first vehicle determines a current driving mode of the first vehicle, where the driving mode includes an autonomous driving mode and a manual driving mode; and then the intelligent driving domain controller obtains the first trajectory of the first vehicle based on the driving mode of the first vehicle.

In a possible implementation, when the intelligent driving domain controller of the first vehicle determines the driving mode of the first vehicle, the driving domain controller may communicate with another vehicle by using a vehicle-mounted communication apparatus. For example, a driving mode query message is sent, and then the another vehicle notifies the first vehicle of a driving mode of the another vehicle in a form of a response message. Optionally, the first vehicle may further collect an image of the another vehicle by using a camera, so as to analyze a status of a driver in the another vehicle (for example, whether the driver holds a steering wheel and whether the driver is at rest) and determine whether the vehicle is in an autonomous driving mode.

For example, that the intelligent driving domain controller of the first vehicle obtains the first trajectory of the first vehicle based on the driving mode of the first vehicle may specifically include the following two cases:

Case 1: When the intelligent driving domain controller determines that the driving mode is the autonomous driving mode, the intelligent driving domain controller obtains an autonomous driving trajectory of the first vehicle, and uses the autonomous driving trajectory as the first trajectory.

Case 2: When the intelligent driving domain controller determines that the driving mode is the manual driving mode, the intelligent driving domain controller predicts a manual driving trajectory of the first vehicle, and uses the predicted manual driving trajectory as the first trajectory.

In an example, when the first vehicle is in the manual driving mode, that the intelligent driving domain controller predicts a manual driving trajectory of the first vehicle may be specifically: The intelligent driving domain controller obtains a first parameter set, where the first parameter set includes a location of the first vehicle, driving data of a surrounding obstacle of the first vehicle relative to the first vehicle, and a driving status of the first vehicle, and the driving status of the first vehicle is used to indicate a driving habit of a user currently driving the first vehicle; the intelligent driving domain controller obtains a trajectory prediction model corresponding to the first vehicle, where the trajectory prediction model is trained based on historical data of the driving habit of the user currently driving the first vehicle; the intelligent driving domain controller predicts a trajectory point of the first vehicle based on the first parameter set and the trajectory prediction model; and the intelligent driving domain controller determines the manual driving trajectory of the first vehicle based on the trajectory point of the first vehicle.

For example, the location of the first vehicle may include a longitude (P_long) and a latitude (P_lati) that identify a location of the first vehicle at a current moment in a terrestrial coordinate system. Optionally, in a process of training the trajectory prediction model, a prediction result may be compared with the location of the first vehicle to confirm whether the prediction result is accurate, so as to continually adjust the model, so that the trained trajectory prediction model has relatively high accuracy.

The surrounding obstacle of the first vehicle includes one or more obstacles, and driving data of any obstacle may include a relative velocity (Obj_v) and a relative distance (Obj_d) of the any obstacle relative to the first vehicle. It should be noted that the any obstacle herein may be a vehicle, such as a second vehicle.

The driving status of the first vehicle may include an attribute of a current lane on a road on which the first vehicle is located, a road radius (road_radius), and a velocity, an acceleration, an opening degree of an accelerator pedal (Acc_ped), an opening degree of a brake pedal (Bra_ped), a front right brake wheel cylinder (P_(Cy, FR)), a front left brake wheel cylinder (P_(Cy, FL)), a rear right brake wheel cylinder (P_(Cy, RR)), a rear left brake wheel cylinder (P_(Cy, RL)), a steering wheel angle (Ste_ang), a steering wheel angle velocity (Ste_angv), a steering wheel torque (Ste_torq), a gear (gear), and a turn light signal (Turn_sig) that are of the first vehicle.

The attribute of a current lane on a road may be a quantity of current lanes of the road, whether the lane is a curved or straight lane, or the like. When the current lane is a curved lane, the road radius may be a radius of the curved lane. When the current lane is a straight lane, the road radius may be zero or infinite. The opening degree of an accelerator pedal refers to a percentage of opening and closing of the accelerator pedal, and may be considered as a hundred percent when the accelerator pedal is fully depressed, and may be considered as zero when the accelerator pedal is not depressed. The front right brake wheel cylinder, the front left brake wheel cylinder, the rear right brake wheel cylinder, and the rear left brake wheel cylinder each are control parameters on each wheel of the first vehicle. The gear refers to a different level divided in a forward gear in a driving process of an autonomous vehicle, and different levels correspond to different velocities.

The trajectory point of the first vehicle predicted by the intelligent driving domain controller of the first vehicle based on the foregoing parameters may include a predicted longitude and a predicted latitude that are included in a predicted driving trajectory (that is, the predicted manual driving trajectory) of the first vehicle. Optionally, the trajectory point of the first vehicle further includes confidence of the predicted longitude and confidence of the predicted latitude. The trajectory point of the first vehicle may be a trajectory point set, which may include trajectory points in a period of time (for example, 5 s). Confidence of prediction precision identifies accuracy of the prediction precision, and the confidence of the predicted latitude identifies accuracy of the predicted latitude. In this way, when the predicted trajectory is obtained based on the trajectory point, accuracy of the trajectory point may be learned, so that accuracy of the predicted trajectory can be determined. Therefore, the intelligent driving domain controller selects a predicted trajectory with relatively high accuracy to plan a subsequent trajectory.

In specific implementation, different users have different driving habits, and there are different related parameters when different users drive the first vehicle. The relative distance and the relative velocity of the obstacle, the lane attribute of the road, and the road radius describe an environment in which the driver (that is, the user) is located. The velocity and the acceleration of the vehicle describe a vehicle status. The opening degree of the accelerator pedal describes a driver's habit of depressing an accelerator in a current environment and a current vehicle status. The opening degree of the brake pedal, the front right brake wheel cylinder, the front left brake wheel cylinder, the rear right brake wheel cylinder, and the rear left brake wheel cylinder describe a driver's habit of depressing a brake in the current environment and the current vehicle status. The steering wheel angle, the steering wheel angle velocity, the steering wheel torque, and the turn light signal describe a driver's habit of turning in the current environment and the current vehicle status. When different drivers drive the vehicle, the foregoing parameters are different. In this application, for different users, training is respectively performed based on a driving habit of each user, to train a parameter of a preset neural network model that fits the user, so that a trajectory that meets a characteristic of the user can be predicted.

Specifically, the foregoing involved driving status of the first vehicle only indicates the driving habit of the user currently driving the first vehicle, and the neural network prediction model is also trained based on the driving habit of the user driving the first vehicle. For example, during specific training, model training may be performed by using a cloud server, and the cloud server sends a trained model parameter to the intelligent driving domain controller. When the cloud server performs model training, a training set used includes an input set and an output set. The input set may be a plurality of parameter sets that are recorded by the intelligent driving domain controller of the first vehicle and that are obtained when the user currently driving the first vehicle drives the first vehicle in a past period of time or in real time. A parameter included in each parameter set is the same as a parameter included in the first parameter set. A trajectory point of a first vehicle corresponding to each parameter set is used as an output set, that is, expected output during model training. Specifically, the intelligent driving domain controller sends the training set to the cloud server through V2X. For example, a training process of the cloud server may be as follows:

(1) Network determining: that is, determining a size of the neural network prediction model. A quantity of neurons of a hidden layer is determined by using a cut and trial method. Specifically, a relatively small quantity of neurons is first disposed to train a network, then the quantity of neurons is increased one by one, training is performed by using a same sample set, and results are compared. When a result is no longer improved, increasing of the quantity of neurons is stopped, and an optimal quantity of neurons is determined. In this application, the neural network prediction model may include one input layer, one hidden layer, and one output layer.

A quantity of neurons of the hidden layer may be first determined according to an empirical formula, and then increased one by one. Optionally, for the empirical formula, references may be made to the following Formula 1 or another formula:

$$n=\sqrt{ml}$$ Formula 1, where m is a quantity of dimensions of the input set (that is, a quantity of parameters in the input set), and l is a quantity of dimensions of the output set.

(2) Model training: that is, determining a model parameter of the neural network prediction model.

For example, an output set of the hidden layer is $\{S_0, S_1, \ldots, S_t, S_{t+1}, \ldots\}$. The output set of the hidden layer is an intermediate value set obtained according to a specified function of the hidden layer in a training process after the input set of the training set is input into the model. The input set may be a plurality of parameter sets that are recorded by the intelligent driving domain controller of the first vehicle and that are obtained when the user currently driving the first vehicle drives the first vehicle in a past period of time or in real time. A parameter included in each parameter set is the same as a parameter included in the first parameter set. A specific output function of the hidden layer meets the following Formula 2:

$$S_t = f(U \times X_t + W \times S_{t-1})$$ Formula 2, where $X_t$ is the input set in the training set, and U and W are weight coefficients.

An obtained output set $O_t$ in the training set meets the following Formula 3:

$$O_t = \text{softmax}(VS_t)$$ Formula 3, where softmax($VS_t$) is a planning index function, where the planning index function is used to process the output set of the hidden layer to obtain a final output result of the trajectory prediction model; and V is a weight matrix.

Further, a loss value is calculated by using a loss function, and the model parameter is adjusted until the loss function hardly improves. The loss function is used to make a trained model meet a model precision requirement. The model is trained by using the training set, and the trained model is tested by using an untrained data set. When model precision meets the requirement, model parameters U, W, and V are determined, so that the trajectory prediction model for the driving habit of the user currently driving the first vehicle is obtained. For example, the loss function J may meet the following Formula 4:

$$J = \frac{1}{N}\sum_{i=1}^{N} J(U, V, W; X_t, O_t),$$ Formula 4 where

N is a quantity of pairs of input sets and output sets included in the training set.

Based on the foregoing process, the cloud server completes training of the neural network prediction model. Then, the cloud server transmits the finally determined model parameters U, W, and V to the intelligent driving domain controller of the first vehicle, so that the intelligent driving domain controller predicts the trajectory point of the first vehicle.

In an optional implementation, the intelligent driving domain controller of the first vehicle may send the first parameter set and the trajectory point of the first vehicle to the cloud server, so that the cloud server corrects the trajectory prediction model based on the first parameter set and the trajectory point of the first vehicle. Then, the intelligent driving domain controller receives a corrected trajectory prediction model sent by the cloud server, and predicts a trajectory point of the first vehicle by using the corrected trajectory prediction model and a second parameter set. The second parameter set is data that is collected at a current moment and that includes a location of the first vehicle, driving data of a surrounding obstacle of the first vehicle relative to the first vehicle, and a driving status of the first vehicle. In other words, the cloud server may continually update a previously trained trajectory prediction model based on driving data sent by the intelligent driving domain controller of the intelligent vehicle or a controller of a non-intelligent vehicle, so that model training is more accurate, and further, trajectory prediction of the vehicle is more accurate. Therefore, more accurate trajectory planning can be performed to improve safety.

For each vehicle, a vehicle-mounted controller of the vehicle may collect driving data of a current driver, and send the data to the cloud server. Then, the cloud server obtains, through training based on the driving data, a customized driving model matching a driving habit of the current driver, and sends the customized driving model to the vehicle-mounted controller. When performing trajectory prediction of the first vehicle, the intelligent driving domain controller of the first vehicle may determine a driving trajectory of the first vehicle based on a predicted driving trajectory sent by each vehicle. Optionally, the intelligent driving domain controller of the first vehicle may obtain a driving model and driving data of a driver at a current moment that are of the surrounding vehicle, and separately predict a driving trajectory of each vehicle based on the driving model and the driving data. In a possible embodiment, a process of predicting the driving trajectory of each vehicle may also be completed by the cloud server. Each vehicle sends driving data of a driver at a current moment of the vehicle to the cloud server. The cloud server separately predicts a driving trajectory based on a customized driving model corresponding to each vehicle, and sends a predicted driving trajectory to the intelligent driving domain controller of the first vehicle, so that the intelligent driving domain controller determines the driving trajectory of the first vehicle.

In a specific implementation, after obtaining the first trajectory, the intelligent driving domain controller of the first vehicle sends the first trajectory to at least one second vehicle, so that any second vehicle in the at least one second vehicle performs trajectory planning with reference to a trajectory of the first vehicle.

Step 302: An intelligent driving domain controller of each second vehicle in at least one second vehicle obtains a second trajectory of the second vehicle. FIG. 3 is a schematic diagram of two second vehicles. However, it should be understood that a quantity of vehicles in FIG. 3 is not intended to limit a quantity of the at least one, and there may be one or more than two second vehicles.

Specifically, a method for obtaining the second trajectory by an intelligent driving domain controller of any second vehicle is the same as a method for obtaining the first trajectory by the intelligent driving domain controller of the first vehicle in step 301, and references may be made to each other. Details are not described herein.

Step 303: The intelligent driving domain controller of the first vehicle obtains the second trajectory of the at least one second vehicle based on a first communication technology.

In an example implementation, when obtaining data of another vehicle or sending data to another vehicle, the intelligent driving domain controller of the first vehicle may use the first communication technology involved in step 303. For example, the first communication technology may be a V2X technology.

In an optional implementation, before the intelligent driving domain controller of the first vehicle obtains data of another vehicle (for example, the at least one second vehicle) or sends data to another vehicle, the intelligent driving domain controller determines that a current moment is within a preset time period for communicating with the another vehicle, or the intelligent driving domain controller determines that the first vehicle and the another vehicle have passed security authentication, that is, mutual trust is established by using an authentication result, that is, the intelligent driving domain controller needs to establish mutual trust between the first vehicle and the at least one second vehicle. In other words, if the first vehicle needs to obtain a driving trajectory of another vehicle, security authentication of the another vehicle needs to be obtained first. Only after mutual trust is obtained by the two parties by passing mutual security authentication, the first vehicle can learn about the driving trajectory of the another vehicle, thereby improving vehicle driving safety on a road. Optionally, the first vehicle may establish mutual trust with the another vehicle in the following manner: The intelligent driving domain controller determines that the at least one second vehicle is within a preset range, where the preset range is a circular area centered on the first vehicle, and a radius of the circular area is a specified value. Then, the intelligent driving domain controller sends a security authentication message to a vehicle in the preset range, where the security authentication message includes a type of security authentication (for example, password-based authentication and digital signature (digital signature) authentication), and an identifier of the first vehicle (for example, a vehicle device number). The another vehicle performs processing and makes a response based on the security authentication message. After that, the intelligent driving domain controller establishes a trust relationship with the surrounding vehicle based on a response message, so as to obtain the predicted driving trajectory of the surrounding vehicle. In addition, a process of mutual trust authentication between different vehicles needs to be confirmed within a preset time. For example, an inter-vehicle mutual trust status may be periodically confirmed, or a mutual trust link is maintained after mutual trust is established for the first time, and a security authentication status is monitored in real time through the mutual trust link.

It should be noted that sorting of step 301 to step 303 does not limit an execution sequence of the solution. It should be understood that step 302 and step 303 may be performed before step 301 is performed, or the execution sequence may be step 302, step 301, and step 303, or the like.

Step 304: The intelligent driving domain controller of the first vehicle determines trajectory planning of the first vehicle based on the first trajectory and the second trajectory of the at least one second vehicle.

In an optional implementation, when the intelligent driving domain controller of the first vehicle determines the trajectory planning of the first vehicle, the following principles may be met: It is ensured that no traffic rule is violated, for example, none of running a red light, exceeding a velocity limit, driving in an emergency lane, and driving onto a solid line occurs. It is ensured that a distance from an obstacle (for example, another vehicle) is greater than a preset value, to reserve a valid brake range. It is ensured that the first vehicle in not at a same location as the obstacle (for example, another vehicle) at a same moment. Certainly, there are other principles or rules, which are not listed one by one herein.

In a trajectory planning process, when any second vehicle is a special vehicle, for example, an ambulance or a fire fighting truck, the intelligent driving domain controller of the first vehicle may perform special marking on a corresponding trajectory, so as to give way to the special vehicle.

In the foregoing method, in a driving process of the intelligent vehicle, the intelligent driving domain controller of the first vehicle may obtain the driving trajectory of the first vehicle, obtain the driving trajectory determined by the another vehicle based on the customized trajectory prediction model, and then perform trajectory planning on the first vehicle based on an obtained customized driving trajectory. In the foregoing method, a customized trajectory prediction model can be obtained for each driver in the intelligent vehicle or the non-intelligent vehicle in the manual driving mode, and a driving trajectory of the vehicle is predicted based on a driving habit of each driver. Compared with that based on a method for performing trajectory prediction by using a unified rule in a conventional technology, a prediction result is closer to the driving trajectory of the vehicle. Further, the intelligent driving domain controller may determine the driving trajectory of the vehicle based on the predicted trajectory obtained based on the prediction model, to properly plan the driving trajectory of the vehicle, so as to reduce a risk of collision with the another vehicle, and improve driving safety of the intelligent vehicle.

Based on the foregoing embodiments, a specific example is used to describe a trajectory planning method provided in an embodiment of this application. FIG. 2 is used as an example. It is assumed that a vehicle 1 is an autonomous vehicle in a manual driving mode, a vehicle 2 is an autonomous vehicle in an autonomous driving mode, and a vehicle 3 is a man-driving vehicle. The man-driving vehicle mentioned herein refers to a vehicle that includes a device of the autonomous vehicle but that is controlled by a driver to drive. In a driving process of the three vehicles, the vehicle 1, the vehicle 2, and the vehicle 3 first obtain mutual trust by passing mutual security authentication, and then obtain driving trajectories of each other, to implement trajectory planning. Specifically, the following uses a trajectory planning process of the vehicle 1 as an example for description. An intelligent driving domain controller of the vehicle 1 determines that the vehicle 2 and the vehicle 3 are in a circular area that is centered on the vehicle 1 and has a radius of a specified value, and then sends a security authentication message to the vehicle 2 and the vehicle 3, where the security authentication message includes a security authentication type and an identifier of the vehicle 1. Then, after confirming, based on the security authentication message sent by the vehicle 1, that communication can be performed with the vehicle 1, the vehicle 2 and the vehicle 3 separately send a security authentication response message to the vehicle 1, to notify the vehicle 1 that mutual trust is successfully established. After the mutual trust is established, the intelligent driving domain controller of the vehicle 1 obtains a longitude and a latitude of a current location of the vehicle 1, and then separately obtains a relative velocity and a relative distance of each of the vehicle 2 and the vehicle 3 relative to the vehicle 1, an attribute of a current lane on a road, a road radius, and a velocity, an acceleration, an opening degree of an accelerator pedal, an opening degree of a brake pedal, a front right brake wheel cylinder, a front left brake wheel cylinder, a rear right brake wheel cylinder, a rear left brake wheel cylinder, a steering wheel angle, a steering wheel angle velocity, a steering wheel torque, a gear, and a turn light signal that are of the vehicle 1. Then, the intelligent driving domain controller of the vehicle 1 obtains, from a cloud server, a trajectory prediction model that meets a driving habit of a driver currently driving the vehicle 1, inputs the foregoing data into the obtained trajectory prediction model to obtain a predicted trajectory point of the vehicle 1, so as to obtain a manual driving trajectory of the vehicle 1, and sends the predicted manual driving trajectory to the vehicle 2 and the vehicle 3. The intelligent driving domain controller of the vehicle 1 obtains an autonomous driving trajectory of the vehicle 2, and obtains a manual driving trajectory of the vehicle 3 obtained based on a trajectory prediction model that meets a driving habit of a driver driving the vehicle 3. In this way, the vehicle 1 may perform trajectory planning of the vehicle 1 based on the trajectory predicted by the vehicle 1 and trajectories of the vehicle 2 and the vehicle 3 in a preset time period. Specifically, the trajectory of the vehicle 1 obtained by the vehicle 1 is to keep going straight in the current lane in the preset time period. A driving trajectory of the vehicle 3 in the preset time period obtained by the vehicle 1 is to keep going straight in an adjacent right lane of the vehicle 1. A driving trajectory of the vehicle 2 in the preset time period obtained by the vehicle 1 is first to go straight behind the vehicle 3 in a same lane as the vehicle 3, and then to drive after passing the vehicle 3 in the lane in which the vehicle 1 is located. Based on the foregoing predicted driving trajectory, the vehicle 1 may continue to keep going straight while reserving a distance for changing a lane by the vehicle 2. For example, the vehicle 1 may slow down when going straight, until the vehicle 2 successfully changes the lane, properly increase a velocity and continue to go straight, so as to avoid collision with the vehicle 2. Alternatively, after determining that a distance from the vehicle 3 is long enough, the vehicle 1 updates the predicted trajectory. For example, the vehicle 1 changes from going straight to changing the lane while the vehicle 2 changes the lane or after the vehicle 2 changes the lane, keeps going straight behind the vehicle 3 after changing to a lane in which the vehicle 3 is located, and keeps a specified distance from the vehicle 3, so as to avoid collision with the vehicle 2 and the vehicle 3.

By using the foregoing method, the vehicle may perform trajectory planning with reference to a trajectory of another vehicle and the trajectory of the vehicle in the preset time period. A trajectory of each vehicle matches a current driving status of the vehicle. A vehicle driven by a driver has a driving trajectory obtained based on a driving habit of the driver. Compared with that based on a method for performing trajectory prediction by using a unified rule in a conventional technology, a prediction result is closer to the driving trajectory of the vehicle, that is, a predicted trajectory used by the vehicle to perform trajectory planning is closer to the driving trajectory of the vehicle, so that trajectory planning can be relatively accurate. It can be ensured that the vehicle does not appear at a same location with any other vehicle at a same moment, so as to avoid collision, thereby improving driving safety.

Figure 4:
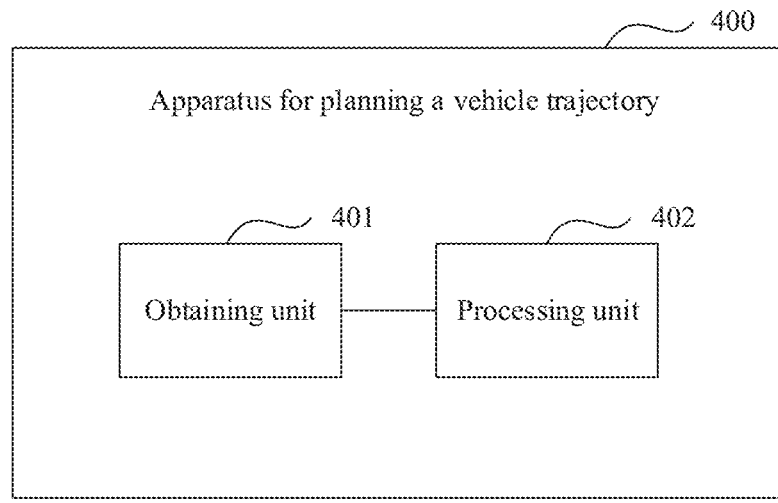
FIG. 4 is a schematic diagram of a structure of an apparatus for planning a vehicle trajectory according to this application.
Figure 5:
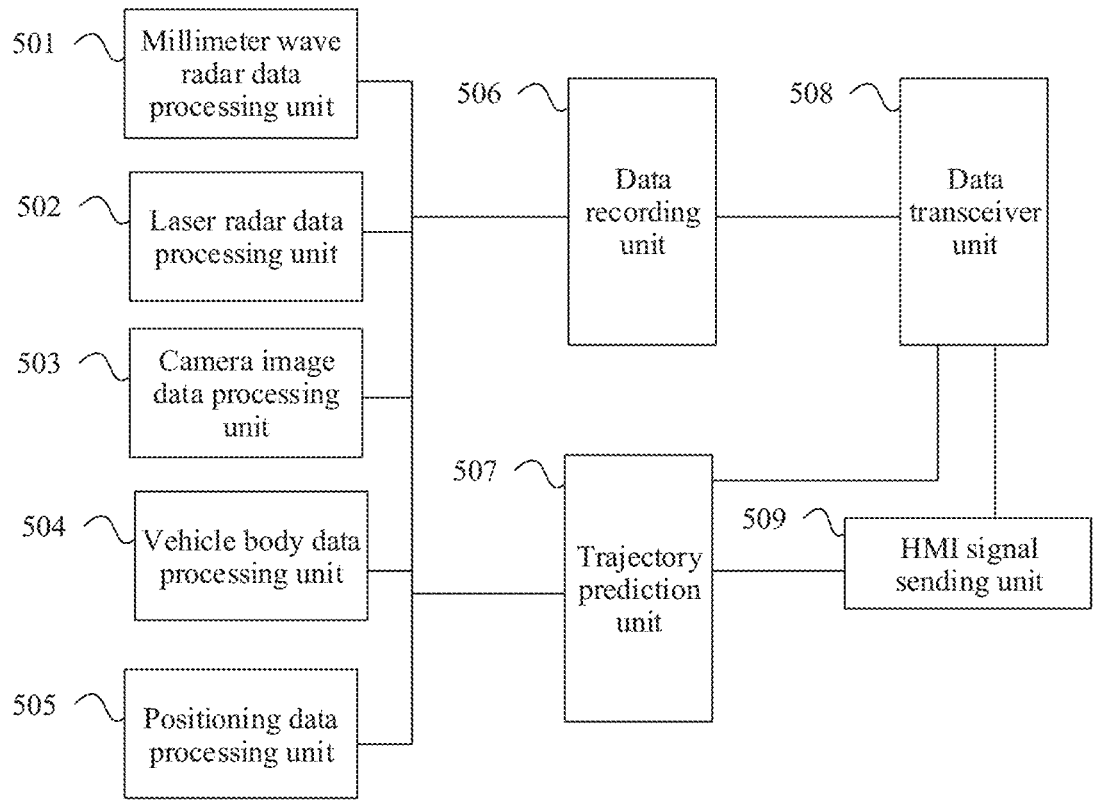
FIG. 5 is a schematic diagram of a structure of an apparatus according to this application.
Figure 6:
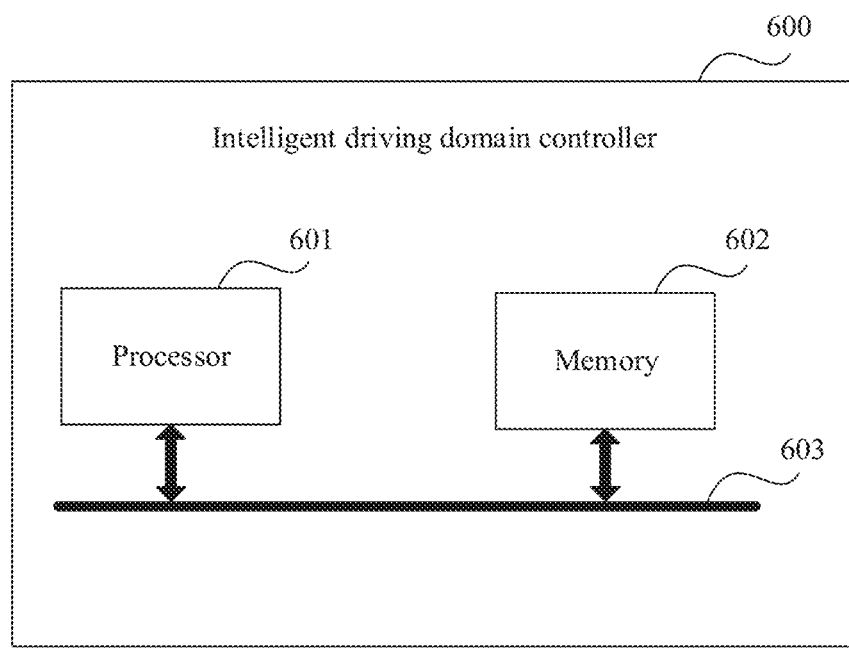
FIG. 6 is a diagram of a structure of an intelligent driving domain controller according to this application.

With reference to FIG. 1 to FIG. 3, the foregoing describes in detail a method for planning a vehicle trajectory according to this application. With reference to FIG. 4 to FIG. 6, the following describes an apparatus for trajectory planning, an intelligent driving domain controller, and an intelligent vehicle according to this application.

FIG. 4 is a schematic diagram of a structure of an apparatus for planning a vehicle trajectory according to this application. As shown in the figure, the apparatus 400 for planning a vehicle trajectory may include an obtaining unit 401 and a processing unit 402.

The obtaining unit 401 is configured to obtain a first trajectory of a first vehicle, and obtain a second trajectory of at least one second vehicle based on a first communication technology.

The processing unit 402 is configured to determine trajectory planning of the first vehicle based on the first trajectory and the second trajectory of the at least one second vehicle.

Optionally, when obtaining the first trajectory of the first vehicle, the obtaining unit 401 is specifically configured to: determine a current driving mode of the first vehicle, where the driving mode includes an autonomous driving mode and a manual driving mode; and obtain the first trajectory of the first vehicle based on the driving mode of the first vehicle.

Optionally, when obtaining the first trajectory of the first vehicle based on the driving mode of the first vehicle, the obtaining unit 401 is specifically configured to: when it is determined that the driving mode is the autonomous driving mode, obtain an autonomous driving trajectory of the first vehicle, and use the autonomous driving trajectory as the first trajectory.

Optionally, when obtaining the first trajectory of the first vehicle based on the driving mode of the first vehicle, the obtaining unit 401 is specifically configured to: when it is determined that the driving mode is the manual driving mode, predict a manual driving trajectory of the first vehicle, and use the predicted manual driving trajectory as the first trajectory.

Specifically, when predicting the manual driving trajectory of the first vehicle, the obtaining unit 401 is specifically configured to: obtain a first parameter set, where the first parameter set includes a location of the first vehicle, driving data of a surrounding obstacle of the first vehicle relative to the first vehicle, and a driving status of the first vehicle, and the driving status of the first vehicle is used to indicate a driving habit of a user currently driving the first vehicle; obtain a trajectory prediction model corresponding to the first vehicle, where the trajectory prediction model is trained based on historical data of the driving habit of the user currently driving the first vehicle; predict a trajectory point of the first vehicle based on the first parameter set and the trajectory prediction model; and determine the manual driving trajectory of the first vehicle based on the trajectory point of the first vehicle.

For example, the location of the first vehicle includes a longitude and a latitude that identify the location of the first vehicle. The surrounding obstacle of the first vehicle includes one or more obstacles, and driving data of any obstacle includes a relative velocity and a relative distance of the any obstacle relative to the first vehicle. The driving status of the first vehicle includes an attribute of a current lane on a road on which the first vehicle is located, a road radius, and a velocity, an acceleration, an opening degree of an accelerator pedal, an opening degree of a brake pedal, a front right brake wheel cylinder, a front left brake wheel cylinder, a rear right brake wheel cylinder, a rear left brake wheel cylinder, a steering wheel angle, a steering wheel angle velocity, a steering wheel torque, a gear, and a turn light signal that are of the first vehicle.

Optionally, the driving data of the any obstacle further includes confidence of the relative velocity of the any obstacle.

Optionally, the trajectory point of the first vehicle includes a predicted longitude and a predicted latitude that are included in a predicted driving trajectory of the first vehicle.

Optionally, the trajectory point of the first vehicle further includes confidence of the predicted longitude and confidence of the predicted latitude.

Optionally, the apparatus 400 for planning a vehicle trajectory further includes a sending unit 403, configured to send the first parameter set and the trajectory point of the first vehicle to a cloud server, so that the cloud server corrects the trajectory prediction model based on the first parameter set and the trajectory point of the first vehicle. The obtaining unit 401 is further configured to receive a corrected trajectory prediction model sent by the cloud server, and predict a trajectory point of the first vehicle by using the corrected trajectory prediction model and a second parameter set. The second parameter set is data that is collected at a current moment and that includes a location of the first vehicle, driving data of a surrounding obstacle of the first vehicle relative to the first vehicle, and a driving status of the first vehicle.

Optionally, the apparatus 400 for planning a vehicle trajectory further includes the sending unit 403, configured to send the first trajectory to the at least one second vehicle.

Optionally, the processing unit 402 is further configured to determine that the at least one second vehicle is in a specified range, where the specified range is a circular area centered on the first vehicle, and a radius of the circular area is a specified value, or determine that the first vehicle and the at least one second vehicle have passed security authentication.

Optionally, the first communication technology is a vehicle wireless communication technology V2X.

It should be understood that the apparatus 400 for planning a vehicle trajectory in this embodiment of this application may be implemented by using an application-specific integrated circuit (application-specific integrated circuit, ASIC) or a programmable logic device (programmable logic device, PLD). The PLD may be a complex programmable logic device (complex programmable logic device, CPLD), a field-programmable gate array (field-programmable gate array, FPGA), a generic array logic (generic array logic, GAL), or any combination thereof. Alternatively, when the trajectory planning method shown in FIG. 3 is implemented by using software, the apparatus 400 for planning a vehicle trajectory and each module thereof may also be software modules.

The apparatus 400 for planning a vehicle trajectory according to this embodiment of this application may correspondingly perform the method described in the embodiments of this application. In addition, the foregoing and other operations and/or functions of units in the apparatus 400 for planning a vehicle trajectory are separately used to implement a corresponding procedure of the method in FIG. 3. For brevity, details are not described herein.

In a driving process of an intelligent vehicle, the apparatus 400 for planning a vehicle trajectory may obtain a driving trajectory of the vehicle, obtain a driving trajectory determined by another vehicle based on a customized trajectory prediction model, and then perform trajectory planning on the vehicle based on an obtained customized driving trajectory. The foregoing apparatus can obtain a customized trajectory prediction model for each driver in an intelligent vehicle or a non-intelligent vehicle in a manual driving mode, and predict a driving trajectory of the vehicle based on a driving habit of each driver. Compared with that based on trajectory prediction performed by using a unified rule in a conventional technology, a prediction result is closer to the driving trajectory of the vehicle. Further, the foregoing apparatus may determine the driving trajectory of the vehicle based on a predicted trajectory obtained based on the prediction model, to properly plan the driving trajectory of the vehicle, so as to reduce a risk of collision with another vehicle, and improve driving safety of the intelligent vehicle.

In an optional implementation, for the obtaining unit 401 and the processing unit 402 in FIG. 4, functions of the obtaining unit 401 and the processing unit 402 may be implemented by using one or more functional modules or units that are more refined, and optionally, may be implemented by using units shown in FIG. 5. For example, the obtaining unit 401 may be implemented by a millimeter wave radar data processing unit 501, a laser radar data processing unit 502, a camera image data processing unit 503, a vehicle body data processing unit 504, a positioning data processing unit 505, a data recording unit 506, and a trajectory prediction unit 507 that are in an apparatus shown in FIG. 5. The sending unit 403 may be implemented by a data transceiver unit 508 and a human machine interface (human machine interface, HMI) signal sending unit 509 that are shown in FIG. 5.

The millimeter wave radar data processing unit 501 is configured to receive data sent by a millimeter wave radar (for example, the millimeter wave radar 101 shown in FIG. 1). When the received data is data such as a distance from and a velocity of a surrounding obstacle, coordinate systems of the distance and the velocity each are converted into vehicle body coordinate systems, and after being marked with time stamps, the distance and the velocity are sent to the data recording unit 506 and the trajectory prediction unit 507. When the received data is a beam transmission time and a beam velocity of a beam that arrives at the obstacle, data such as a distance from and a velocity of the surrounding obstacle are first calculated, and sent to the data recording unit 506 and the trajectory prediction unit 507.

The laser radar data processing unit 502 is configured to receive data sent by a laser radar (for example, the laser radar 102 shown in FIG. 1). When the received data is data such as a distance from and a velocity of a surrounding obstacle, coordinate systems of the distance and the velocity each are converted into vehicle body coordinate systems, and after being marked with time stamps, the distance and the velocity are sent to the data recording unit 506 and the trajectory prediction unit 507. When the received data is a signal reflected from the obstacle and a transmitted signal, data such as a distance from and a velocity of the surrounding obstacle are first calculated, and sent to the data recording unit 506 and the trajectory prediction unit 507.

The camera image data processing unit 503 receives data transmitted by a camera (for example, the camera 103 shown in FIG. 1). When data such as a velocity of and a distance from a surrounding obstacle that are sent by an intelligent camera is received, coordinate systems of the distance and the velocity each are converted into vehicle body coordinate systems, and after being marked with time stamps, the distance and the velocity are sent to the data recording unit 506 and the trajectory prediction unit 507. When an image or a video is received, data such as a velocity of and a distance from the surrounding obstacle are first obtained by analyzing the image or the video, and sent to the data recording unit 506 and the trajectory prediction unit 507.

The vehicle body data processing unit 504 obtains data of a vehicle (vehicle), for example, obtains data sent by the another controller 107 of the vehicle shown in FIG. 1, and sends the obtained data to the data recording unit 506 and the trajectory prediction unit 507.

The positioning data processing unit 505 receives positioning data (for example, obtains data from the high-precision positioning device shown in FIG. 1), and sends the positioning data to the data recording unit 506 and the trajectory prediction unit 507.

The data recording unit 506 stores received data in a memory (for example, a read-only memory (read-only memory, ROM)), and periodically sends the received data to the data transceiver unit 508.

The data transceiver unit 508 periodically sends the received data sent by the data recording unit 506 to a cloud (for example, the cloud 100 shown in FIG. 1), periodically receives a model parameter at the cloud, sends the model parameter to the trajectory prediction unit 507, and sends an obtained predicted trajectory to a surrounding vehicle in real time.

The trajectory prediction unit 507 predicts a trajectory of the vehicle by using a model based on the parameter sent back from the cloud, and sends the trajectory to the HMI signal sending unit 509 and the data transceiver unit 508.

The HMI signal sending unit 509 sends the received trajectory to a display unit, so that a driver learns about a driving trajectory of the intelligent vehicle. Optionally, the driver may also change the driving trajectory by using the display unit.

The foregoing apparatus can obtain a customized trajectory prediction model for each driver in an intelligent vehicle or a non-intelligent vehicle in a manual driving mode, and predict a driving trajectory of the vehicle based on a driving habit of each driver. Compared with that based on trajectory prediction performed by using a unified rule in a conventional technology, a prediction result is closer to the driving trajectory of the vehicle. Further, the foregoing apparatus may determine the driving trajectory of the vehicle based on a predicted trajectory obtained based on the prediction model, to properly plan the driving trajectory of the vehicle, so as to reduce a risk of collision with another vehicle, and improve driving safety of the intelligent vehicle.

FIG. 6 is a schematic diagram of a structure of an intelligent driving domain controller according to an embodiment of this application. The intelligent driving domain controller is applied to the system shown in FIG. 1, and is configured to implement the method for planning a vehicle trajectory shown in FIG. 3. Referring to FIG. 6, the intelligent driving domain controller 600 may include a processor 601, a memory 602, and a bus 603. The processor 601 and the memory 602 communicate through the bus 603, or may communicate by another means such as wireless transmission. The memory 602 is configured to store instructions. The processor 601 is configured to execute the instructions stored in the memory 602. The memory 602 stores program code, and the processor 601 may invoke the program code stored in the memory 602 to perform the following operations:

obtaining a first trajectory of a first vehicle, obtaining a second trajectory of at least one second vehicle by using a first communication technology, and determining trajectory planning of the first vehicle based on the first trajectory and the second trajectory of the at least one second vehicle.

Optionally, the intelligent driving domain controller 600 shown in FIG. 6 further includes an internal storage and a communication interface (that are not shown in FIG. 6), where the internal storage may be physically integrated with the processor, or exists in the processor or in an independent unit form. A computer program may be stored in the internal storage or the memory. Optionally, computer program code (for example, a kernel or a to-be-debugged program) stored in the memory is copied to the internal storage, so as to be executed by the processor.

It should be understood that, in this embodiment of this application, the processor 601 may be a central processing unit (central processing unit, CPU), or the processor 601 may be another general-purpose processor, a digital signal processor (digital signal processing, DSPDSP), an application-specific integrated circuit (application-specific integrated circuit, ASIC), or a programmable logic device (programmable logic device, PLD). The PLD may be a complex programmable logic device (complex programmable logic device, CPLD), a field-programmable gate array (field-programmable gate array, FPGA), a generic array logic (generic array logic, GAL), or any combination thereof. Alternatively, the processor 601 may be another programmable logic device, a discrete gate or a transistor logic device, a discrete hardware component, or the like. The general-purpose processor may be a microprocessor, any conventional processor, or the like.

The memory 602 may include a read-only memory and a random access memory, and provides instructions, a program, data, and the like to the processor 601. For example, the program may include program code, and the program code includes computer operation instructions. The memory 602 may further include a nonvolatile random access memory. For example, the memory 602 may further store information of a device type.

The memory 602 may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. For example but not limitation, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In addition to a data bus, the bus 603 may further include an address bus, a power bus, a control bus, a status signal bus, and the like. The bus 603 may be a peripheral component interconnect (peripheral component interconnect, PCI) bus, an extended industry standard architecture (extended Industry standard architecture, EISA) bus, or the like, or may be a controller area network (controller area network, CAN), or may be a vehicle-mounted Ethernet (Ethernet), or another internal bus that implements connection of the components/devices shown in FIG. 6. However, for clear description, various types of buses in FIG. 6 are marked as the bus 603. For ease of indication, the bus is indicated by using only one bold line in FIG. 6. However, it does not indicate that there is only one bus or only one type of bus.

It should be understood that the intelligent driving domain controller 600 according to this embodiment of this application may correspond to the apparatus 400 for planning a vehicle trajectory in the embodiment of this application, and may correspondingly perform operation steps performed by the intelligent driving domain controller in the method shown in FIG. 3. In addition, the foregoing and other operations and/or functions of modules in the intelligent driving domain controller 600 are separately used to implement a corresponding procedure of the method in FIG. 3. For brevity, details are not described herein.

In a driving process of an intelligent vehicle, the intelligent driving domain controller 600 may obtain a driving trajectory of the vehicle, obtain a driving trajectory determined by another vehicle based on a customized trajectory prediction model, and then perform trajectory planning on the vehicle based on an obtained customized driving trajectory. The intelligent driving domain controller 600 can obtain a customized trajectory prediction model for each driver in an intelligent vehicle or a non-intelligent vehicle in a manual driving mode, and predict a driving trajectory of the vehicle based on a driving habit of each driver. Compared with that based on trajectory prediction performed by using a unified rule in a conventional technology, a prediction result is closer to the driving trajectory of the vehicle. Further, the intelligent driving domain controller 600 may determine the driving trajectory of the vehicle based on a predicted trajectory obtained based on the prediction model, to properly plan the driving trajectory of the vehicle, so as to reduce a risk of collision with the another vehicle, and improve driving safety of the intelligent vehicle.

This application further provides an intelligent vehicle, and the intelligent vehicle may include the foregoing involved intelligent driving domain controller or apparatus for planning a vehicle trajectory. In an example, the intelligent vehicle may be the first vehicle involved in this application.

This application further provides the trajectory prediction system shown in FIG. 1. The trajectory prediction system includes a first vehicle, at least one second vehicle, and a cloud. The foregoing components or devices are separately configured to execute an operation step of a corresponding execution body in the method shown in FIG. 3. For brevity, details are not described herein.

All or a part of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions. When the computer program instructions are loaded or executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (solid-state drive, SSD).

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the foregoing apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other similar forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the technical solutions of this application.

The foregoing description is merely specific implementations of this application. Any variation or replacement readily figured out by a person skilled in the art based on the specific implementations provided in this application shall fall within the protection scope of this application.

What is claimed is:

1. A method for planning a vehicle trajectory, wherein the method is applied to intelligent driving domain controller of a first vehicle, the first vehicle is an intelligent vehicle, and the method comprises:

obtaining, by the intelligent driving domain controller, a first trajectory of the first vehicle, wherein the obtaining, by the intelligent driving domain controller, a first trajectory of the first vehicle comprises:

obtaining, by the intelligent driving domain controller, a first parameter set, wherein the first parameter set comprises a location of the first vehicle, driving data of a surrounding obstacle of the first vehicle relative to the first vehicle, and a driving status of the first vehicle, and the driving status of the first vehicle indicates a driving habit of a user currently driving the first vehicle;

obtaining, by the intelligent driving domain controller and based on the driving status of the first vehicle, a trajectory prediction model corresponding to the first vehicle, wherein the trajectory prediction model is trained based on historical data of the driving habit of the user currently driving the first vehicle;

predicting, by the intelligent driving domain controller, a trajectory point of the first vehicle based on the first parameter set and the trajectory prediction model; and determining, by the intelligent driving domain controller, the first trajectory of the first vehicle based on the trajectory point of the first vehicle;
obtaining, by the intelligent driving domain controller, a second trajectory of at least one second vehicle by using a first wireless telecommunication technology;
determining, by the intelligent driving domain controller, trajectory planning of the first vehicle based on the first trajectory and the second trajectory of the at least one second vehicle; and
sending, by the intelligent driving domain controller, the first trajectory to the at least one second vehicle.

2. The method according to claim 1, wherein the obtaining, by the intelligent driving domain controller, a first trajectory of the first vehicle comprises:
determining, by the intelligent driving domain controller, a current driving mode of the first vehicle, wherein the current driving mode comprises an autonomous driving mode and a manual driving mode; and
obtaining, by the intelligent driving domain controller, the first trajectory of the first vehicle based on the current driving mode of the first vehicle.

3. The method according to claim 2, wherein the obtaining, by the intelligent driving domain controller, the first trajectory of the first vehicle based on the current driving mode of the first vehicle comprises:
when the intelligent driving domain controller determines that the current driving mode of the first vehicle is the manual driving mode, predicting, by the intelligent driving domain controller, a manual driving trajectory of the first vehicle, and using the predicted manual driving trajectory as the first trajectory.

4. The method according to claim 1, wherein
the location of the first vehicle comprises a longitude and a latitude that identify the location of the first vehicle;
the surrounding obstacle of the first vehicle comprises one or more obstacles, and driving data of each of the one or more obstacles comprises a relative velocity and a relative distance of the respective obstacle relative to the first vehicle; and
the driving status of the first vehicle comprises an attribute of a current lane on a road on which the first vehicle is located, a road radius, and at least one of the following of the first vehicle: a velocity, an acceleration, an opening degree of an accelerator pedal, an opening degree of a brake pedal, a front right brake wheel cylinder, a front left brake wheel cylinder, a rear right brake wheel cylinder, a rear left brake wheel cylinder, a steering wheel angle, a steering wheel angle velocity, a steering wheel torque, a gear, or a turn light signal.

5. The method according to claim 1, wherein the trajectory point of the first vehicle comprises a predicted longitude and a predicted latitude that are comprised in a predicted driving trajectory of the first vehicle.

6. The method according to claim 1, wherein the method further comprises:
sending, by the intelligent driving domain controller, the first parameter set and the trajectory point of the first vehicle to a cloud server;
receiving, by the intelligent driving domain controller, a corrected trajectory prediction model sent by the cloud server; and
predicting, by the intelligent driving domain controller, a trajectory point of the first vehicle by using the corrected trajectory prediction model and a second parameter set, wherein the second parameter set is data that is collected at a current moment and that comprises a location of the first vehicle, driving data of a surrounding obstacle of the first vehicle relative to the first vehicle, and a driving status of the first vehicle.

7. The method according to claim 1, wherein the method further comprises:
determining, by the intelligent driving domain controller, that the at least one second vehicle is in a specified range, wherein the specified range is a circular area centered on the first vehicle, and a radius of the circular area is a specified value; and
determining, by the intelligent driving domain controller, that the first vehicle and the at least one second vehicle have passed security authentication.

8. The method according to claim 1, wherein the method further comprises:
determining, by the intelligent driving domain controller, the first trajectory of the first vehicle according to at least one of the following rules:
rule 1: no traffic rule is violated;
rule 2: a distance from an obstacle is greater than a preset value; or
rule 3: not at a same location as an obstacle at a same moment.

9. An intelligent driving domain controller, comprising at least one processor and a memory, wherein the memory stores computer program instructions, and when the intelligent driving domain controller runs, the at least one processor executes the computer program instructions stored in the memory to implement the following operation steps:
obtaining, by the intelligent driving domain controller, a first trajectory of a first vehicle, wherein the obtaining, by the intelligent driving domain controller, a first trajectory of the first vehicle comprises:
obtaining, by the intelligent driving domain controller, a first parameter set, wherein the first parameter set comprises a location of the first vehicle, driving data of a surrounding obstacle of the first vehicle relative to the first vehicle, and a driving status of the first vehicle, and the driving status of the first vehicle indicates a driving habit of a user currently driving the first vehicle;
obtaining, by the intelligent driving domain controller and based on the driving status of the first vehicle, a trajectory prediction model corresponding to the first vehicle, wherein the trajectory prediction model is trained based on historical data of the driving habit of the user currently driving the first vehicle;
predicting, by the intelligent driving domain controller, a trajectory point of the first vehicle based on the first parameter set and the trajectory prediction model; and
determining, by the intelligent driving domain controller, the first trajectory of the first vehicle based on the trajectory point of the first vehicle;
obtaining, by the intelligent driving domain controller, a second trajectory of at least one second vehicle by using a first wireless telecommunication technology;
determining, by the intelligent driving domain controller, trajectory planning of the first vehicle based on the first trajectory and the second trajectory of the at least one second vehicle; and
sending, by the intelligent driving domain controller, the first trajectory to the at least one second vehicle.

10. The intelligent driving domain controller according to claim 9, wherein the at least one processor further executes the computer program instructions stored in the memory to implement the following operation steps:

determining, by the intelligent driving domain controller, a current driving mode of the first vehicle, wherein the current driving mode comprises an autonomous driving mode and a manual driving mode; and obtaining, by the intelligent driving domain controller, the first trajectory of the first vehicle based on the current driving mode of the first vehicle.

11. The intelligent driving domain controller according to claim 10, wherein the at least one processor further executes the computer program instructions stored in the memory to implement the following operation steps:

when the intelligent driving domain controller determines that the current driving mode of the first vehicle is the manual driving mode, predicting, by the intelligent driving domain controller, a manual driving trajectory of the first vehicle, and using the predicted manual driving trajectory as the first trajectory.

12. The intelligent driving domain controller according to claim 9, wherein the at least one processor further executes the computer program instructions stored in the memory to implement the following operation steps:

sending, by the intelligent driving domain controller, the first parameter set and the trajectory point of the first vehicle to a cloud server;

receiving, by the intelligent driving domain controller, a corrected trajectory prediction model sent by the cloud server; and predicting, by the intelligent driving domain controller, a trajectory point of the first vehicle by using the corrected trajectory prediction model and a second parameter set, wherein the second parameter set is data that is collected at a current moment and that comprises a location of the first vehicle, driving data of a surrounding obstacle of the first vehicle relative to the first vehicle, and a driving status of the first vehicle.

13. The intelligent driving domain controller according to claim 9, wherein the at least one processor further executes the computer program instructions stored in the memory to implement the following operation steps:

determining, by the intelligent driving domain controller, that the at least one second vehicle is in a specified range, wherein the specified range is a circular area centered on the first vehicle, and a radius of the circular area is a specified value; and determining, by the intelligent driving domain controller, that the first vehicle and the at least one second vehicle have passed security authentication.

14. The intelligent driving domain controller according to claim 9, wherein the at least one processor further executes the computer program instructions stored in the memory to implement the following operation steps:

determining, by the intelligent driving domain controller, the first trajectory of the first vehicle according to at least one of the following rules:

rule 1: no traffic rule is violated;

rule 2: a distance from an obstacle is greater than a preset value; or rule 3: not at a same location as an obstacle at a same moment.

15. An intelligent vehicle, wherein the intelligent vehicle comprises an intelligent driving domain controller, and the intelligent driving domain controller comprises at least one processor and a memory, wherein the memory stores computer program instructions, and when the intelligent driving domain controller runs, the at least one processor executes the computer program instructions stored in the memory to implement the following operation steps:

obtaining, by the intelligent driving domain controller, a first trajectory of the intelligent vehicle, wherein the obtaining, by the intelligent driving domain controller, a first trajectory of the intelligent vehicle comprises:

obtaining, by the intelligent driving domain controller, a first parameter set, wherein the first parameter set comprises a location of the intelligent vehicle, driving data of a surrounding obstacle of the intelligent vehicle relative to the intelligent vehicle, and a driving status of the intelligent vehicle, and the driving status of the intelligent vehicle indicates a driving habit of a user currently driving the intelligent vehicle;

obtaining, by the intelligent driving domain controller and based on the driving status of the intelligent vehicle, a trajectory prediction model corresponding to the intelligent vehicle, wherein the trajectory prediction model is trained based on historical data of the driving habit of the user currently driving the intelligent vehicle;

predicting, by the intelligent driving domain controller, a trajectory point of the intelligent vehicle based on the first parameter set and the trajectory prediction model; and determining, by the intelligent driving domain controller, the first trajectory of the intelligent vehicle based on the trajectory point of the intelligent vehicle;

obtaining, by the intelligent driving domain controller, a second trajectory of at least one second vehicle based on a first communication technology;

determining, by the intelligent driving domain controller, trajectory planning of the intelligent vehicle based on the first trajectory and the second trajectory of the at least one second vehicle; and sending, by the intelligent driving domain controller, the first trajectory to the at least one second vehicle.

16. The intelligent vehicle according to claim 15, wherein the at least one processor further executes the computer program instructions stored in the memory to implement the following operation steps:

determining, by the intelligent driving domain controller, a current driving mode of the intelligent vehicle, wherein the current driving mode comprises an autonomous driving mode and a manual driving mode; and obtaining, by the intelligent driving domain controller, the first trajectory of the intelligent vehicle based on the current driving mode of the intelligent vehicle.

17. The intelligent vehicle according to claim 15, wherein the location of the intelligent vehicle comprises a longitude and a latitude that identify the location of the intelligent vehicle;

the surrounding obstacle of the intelligent vehicle comprises one or more obstacles, and driving data of each of the one or more obstacles comprises a relative velocity and a relative distance of the respective obstacle relative to the intelligent vehicle; and the driving status of the intelligent vehicle comprises an attribute of a current lane on a road on which the intelligent vehicle is located, a road radius, and at least one of the following of the intelligent vehicle: a velocity, an acceleration, an opening degree of an accelerator pedal, an opening degree of a brake pedal, a front right brake wheel cylinder, a front left brake wheel cylinder, a rear right brake wheel cylinder, a rear left brake wheel cylinder, a steering wheel angle, a steering wheel angle velocity, a steering wheel torque, a gear, or a turn light signal.

18. The intelligent vehicle according to claim 15, wherein the trajectory point of the intelligent vehicle comprises a predicted longitude and a predicted latitude that are comprised in a predicted driving trajectory of the intelligent vehicle.

19. The intelligent vehicle according to claim 15, wherein the at least one processor further executes the computer program instructions stored in the memory to implement the following operation steps:
- sending, by the intelligent driving domain controller, the first parameter set and the trajectory point of the intelligent vehicle to a cloud server;
- receiving, by the intelligent driving domain controller, a corrected trajectory prediction model sent by the cloud server; and
- predicting, by the intelligent driving domain controller, a trajectory point of the intelligent vehicle by using the corrected trajectory prediction model and a second parameter set, wherein the second parameter set is data that is collected at a current moment and that comprises a location of the intelligent vehicle, driving data of a surrounding obstacle of the intelligent vehicle relative to the intelligent vehicle, and a driving status of the intelligent vehicle.

20. The intelligent vehicle according to claim 15, wherein the at least one processor further executes the computer program instructions stored in the memory to implement the following operation steps:
- determining, by the intelligent driving domain controller, that the at least one second vehicle is in a specified range, wherein the specified range is a circular area centered on the intelligent vehicle, and a radius of the circular area is a specified value; and
- determining, by the intelligent driving domain controller, that the intelligent vehicle and the at least one second vehicle have passed security authentication.

* * * * *